Figure 1:
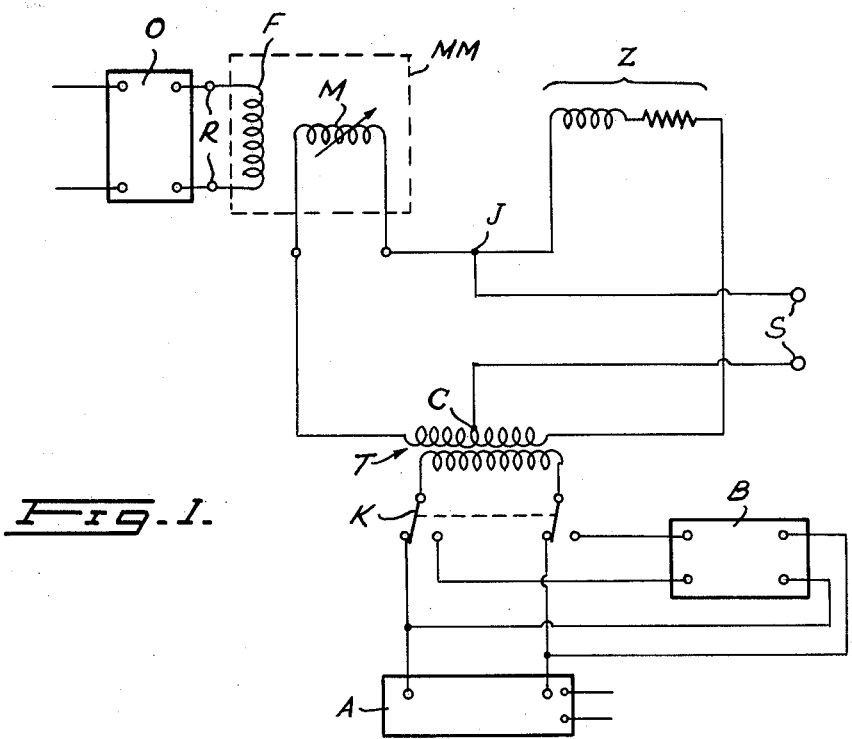

June 18, 1963  D. S. SMITH  3,094,655

NARROW BAND FILTER CIRCUIT

Filed March 28, 1960

Inventor
Donald S. Smith

By Stevens, Davis, Miller & Mosher
Attorneys

United States Patent Office 3,094,655
Patented June 18, 1963

3,094,655
NARROW BAND FILTER CIRCUIT
Donald S. Smith, Cumberland, Ontario, Canada, assignor to National Research Council, Ottawa, Ontario, Canada, a body corporate of Canada
Filed Mar. 28, 1960, Ser. No. 17,868
6 Claims. (Cl. 323—53)

This invention relates to an electric circuit, the principal function of which is to perform as a narrow band filter to discriminate between a received signal of predetermined frequency and surrounding noise. As will appear from the subsequent description, the circuit that is the subject of the present invention may be simultaneously employed as a frequency translator, that is a device for converting a signal received at one frequency into a corresponding output signal at a different frequency.

The main purpose for which the invention has been developed is the detection of a comparatively weak signal received together with such a large volume of noise that detection of the signal is difficult or unreliable with existing apparatus, or else requires elaborate and expensive devices to eliminate the noise. The principal object of the invention may thus be expressed as the provision of a circuit that can detect the presence of a signal buried in noise by means of simple, inexpensive and reliable apparatus. In particular, it is an object to avoid the use of electronic devices and to rely solely on the more robust circuit elements readily available to the engineer.

The requirement to discriminate between a weak signal and surrounding noise is often met with in servo systems, which is one reason why the present invention is expected to find useful application to such systems. Another reason resides in the frequency translating properties of the present circuit. The signal frequency in many servo systems is quite low, for example 15 cycles per second, and this is often not a very convenient frequency for use directly in the instrument to be controlled. Thus the facility of the present circuit to act simultaneously both as a narrow band filter for detection of the signal and also as a frequency translator to feed out the signal at another, more preferred frequently, renders the circuit especially well adapted for use in servo systems. Nevertheless, as will be readily apparent from the description which follows, the circuit may have other useful applications whenever the properties of a narrow band filter are desired, and especially when these properties are required to be combined with those of a frequency translator.

As has been explained, the frequency translating feature is useful in converting from a low frequency such as 15 cycles to a more conveniently usable frequency (say, for example, 400 cycles). A specific aspect of the frequency translating properties of the circuit according to the invention is its ability to receive a D.C. signal buried in noise as an input, and to deliver an A.C. signal of a selected frequency as an output.

The circuit according to the invention in its broad scope comprises a dynamometer type meter movement having a fixed coil and a movable coil arranged with their field directions normally intersecting in quadrature, a balanced bridge one arm of which includes a first one of said coils (preferably the moving coil), means connected to the second of said coils for applying a reference voltage thereto of predetermined frequency, means for applying the signal with accompanying noise across a first diagonal of the bridge to deflect the moving coil as a result of interaction of the fields of the signal and reference voltages, and means for detecting the output voltage across the other diagonal of the bridge. This output voltage is generated in the first coil by transformer effect from the second coil, but is comparatively insensitive to the signal and noise by virtue of the balanced state of the bridge.

When the frequency translating facility is required the circuit also includes means for applying a second reference voltage to the second coil at a second frequency different from the first, predetermined frequency. The output detecting means may then include a device, such as a filter, for discriminating between this second frequency and the predetermined frequency. In this way the second frequency can be substituted in the final output for the predetermined frequency which is necessarily that of the signal.

Figure 2:
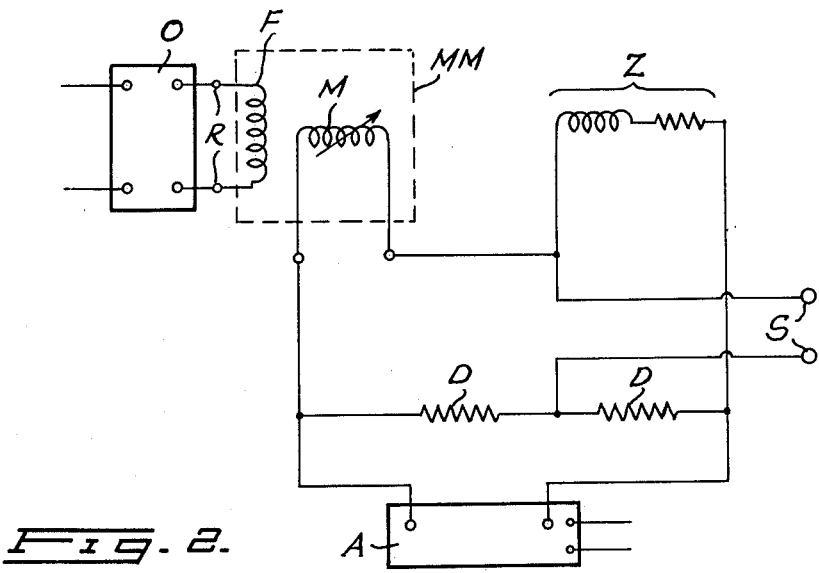

The invention will be further explained with the help of two examples of circuits that embody the invention, these circuits being illustrated in respective circuit diagrams designated FIGURES 1 and 2.

The circuit of FIGURE 1 consists of a meter-like movement MM comprising a fixed coil F and a movable coil M. These coils are arranged similarly to the coils in a zero-centre, dynamometer type wattmeter, with the field of the moving coil M intersecting the field of the fixed coil F in quadrature, at zero deflection of the movement. The moving coil M is connected as one arm of a bridge, the other arms of which are constituted by a dummy impedance Z which matches the impedance of coil M and the two halves of a centre-tapped primary of an output transformer T.

The signal (and noise) are impressed across bridge diagonal terminals S, connected between the centre tap C of the transformer and the junction J of coil M and impedance Z. Let it be assumed that the signal to be detected has a frequency of 15 cycles. A reference sine wave frequency of 15 cycles or equivalent is then impressed across terminals R by oscillator O. Terminals R are connected to coil F. In the absence of a signal, the movement will not deflect, since a high degree of frequency correspondence between the currents in coils F and M is necessary for any deflection to take place. The movement will preferably be given a long time constant by means of oil damping, so that any momentary correspondence in phase between currents in coils F and M will be ineffective to produce deflection.

However, as soon as a signal at the correct frequency appears across terminals S, and hence in the coil M, the currents in coils F and M will cause the latter to deflect in exactly the same way as takes place in a standard wattmeter. It is, of course, preferable that the currents in coils F nad M be in phase with each other, or 180° out-of-phase with each other. The direction of deflection will depend on this phase relationship. At any intermediate phase relationship, the response will be reduced, but will always be present except when the currents are exactly 90° out-of-phase. Thus, for maximum response, a 0° or 180° phase relationship is desirable.

Neither the signal nor the noise received across terminals S will theoretlically appear across the output terminals of transformer T, which reflect the voltage across the other bridge diagonal, since the bridge is balanced and equal and opposite currents will flow in the two halves of the primary of transformer T. In practice, a small amount of noise may get through to the secondary of the transformer, but this can be disregarded.

Whenever the moving coil M is deflected by a signal of proper frequency, there will be induced in such coil M by the fixed coil F a voltage at the reference frequency (15 cycles) proportional to the deflection of coil M. The current which flows in response to this induced voltage will traverse the entire primary of the transformer T in only one direction and hence will induce a corresponding output voltage at the reference frequency across the transformer, which will be detected in amplifier A.

It will be seen that the movement MM constituted by coils F and M acts simultaneously in the two capacities of meter movement (to discriminate between a signal at the reference freqeuncy and noise at other frequencies) and variable transformer (to induce a secondary voltage in coil M proportional to the deflection of such coil and hence proportional to the input signal). In many practical applications it is the mere presence of a signal at terminals S that is required to be detected, without regard to its amplitude, but it will be observed that the present circuit provides an ouput proportional in amplitude to the amplitude of the input, so that quantative detection can be obtained if desired. Furthermore the phase of the output will reflect the phase of the input.

As so far described, the circuit of FIGURE 1 functions essentially as a narrow band filter. In practice a band width of approximately 0.03 cycle has been obtained.

Now assume that two reference frequencies are applied simultaneously by oscillator O to terminals R. One of these reference frequencies must be the same as the signal frequency, for example 15 cycles, and the other can be a frequency (say 400 cycles) chosen for convenience of further use. When a signal appears across terminals S at the first reference frequency, the coil M will deflect as before, but now secondary voltages will be induced in coil M at both frequencies. These secondary voltages will ultimately appear across the secondary of transformer T and may then be passed by switch K through a conventional filter B to output amplifier A. Filter B will remove the 15 cycle signal so that only the 400 cycle signal appears at amplifier A. In this way the circuit has received a 15 cycle signal buried in noise as its input and delivered a proportional 400 cycle signal, substantially free of noise, at its output, thus combining the functions of narrow band filter and frequency translator. Quite often in practice a filter can be dispensed with, since the characteristics of the utilisation circuit will often be such that it will only accept the required frequency. Also it should be appreciated that, if the two frequencies are widely separated, as in the example of 15 and 400 cycles, the 400 cycle frequency tends to dominate in amplitude at the output, because of the inherent filter action of the transformer which better transmits the higher frequency.

If the signal to be detected is D.C., then use of a double reference frequency is essential. To deflect the coil M, there must be a direct current field (zero frequency), while to obtain the transformer effect there must be an alternating current field. The direct current field can be obtained in any convenient way, for example from a permanent magnet mounted in the meter movement, or by including a rectifier in the cabinet with the oscillator O and mixing the direct current so obtained with the normal output of such oscillator. The output at amplifier A will then occur at the selected alternating current reference frequency.

FIGURE 2 shows a modified circuit that operates in essentially the same manner as FIGURE 1. The difference lies in the substitution in the arms of the bridge of a pair of matched resistors D for the primary of the transformer. The bridge remains balanced, thus substantially eliminating the signal and noise from the output, as before, while permitting the voltage induced in moving coil M at the reference frequency or frequencies to appear across this output.

In both examples of the invention illustrated, the reference voltages have been applied to the fixed coil F while the movable coil M has been included in one arm of the bridge. These functions can be reversed, if desired, the reference voltage or voltages being applied to the moving coil and the fixed coil being connected in the bridge. Moreover, any other balanced bridge arrangement may be employed provided it is such that the incoming signal (and with it the noise) does not appear at the output, while the voltage generated by transformer effect in the meter movement does appear at the output.

I claim:

1. A narrow band filter circuit for discriminating between a received signal of predetermined frequency and surrounding noise, said circuit comprising a dynamometer type meter movement having a fixed coil and a movable coil arranged with their field directions normally intersecting in quadrature, a balanced bridge one arm of which includes a first one of said coils, means connected to the second of said coils for applying a reference voltage thereto of said predetermined frequency, means for applying said signal and noise across a first diagonal of the bridge, and means for detecting the output voltage across the other diagonal of the bridge.

2. A circuit according to claim 1, including means connected to the second of said coils for applying a second reference voltage thereto of a second frequency different from said predetermined frequency.

3. A circuit according to claim 2, wherein said means for detecting the output voltage includes means for discriminating between said second and said predetermined frequencies.

4. A circuit according to claim 2, wherein said predetermined frequency is zero.

5. A circuit according to claim 1, wherein the reference voltage is applied to the fixed coil and the moving coil is included in said arm of the bridge.

6. A narrow band filter for discriminating between a received direct current signal and surrounding noise, said circuit comprising a dynamometer type meter movement having a fixed coil and a movable coil arranged with their field directions in quadrature, a balanced bridge one arm of which includes a first one of said coils, means for setting up a unidirectional field along the second of said coils, means connected to said second coil for applying a reference alternating voltage thereto at a selected frequency, means for applying said signal and noise across a first diagonal of the bridge, and means for detecting the output voltage at said selected frequency across the other diagonal of the bridge.

References Cited in the file of this patent

UNITED STATES PATENTS

| | | |
|---|---|---|
| 2,714,635 | Schmitt | Aug. 2, 1955 |
| 2,886,657 | Hirtreiter | May 12, 1959 |